June 22, 1954     J. HALTENBERGER     2,681,687
MOTOR VEHICLE INDEPENDENT SEAT CONTROL
Filed Dec. 8, 1948     2 Sheets-Sheet 2
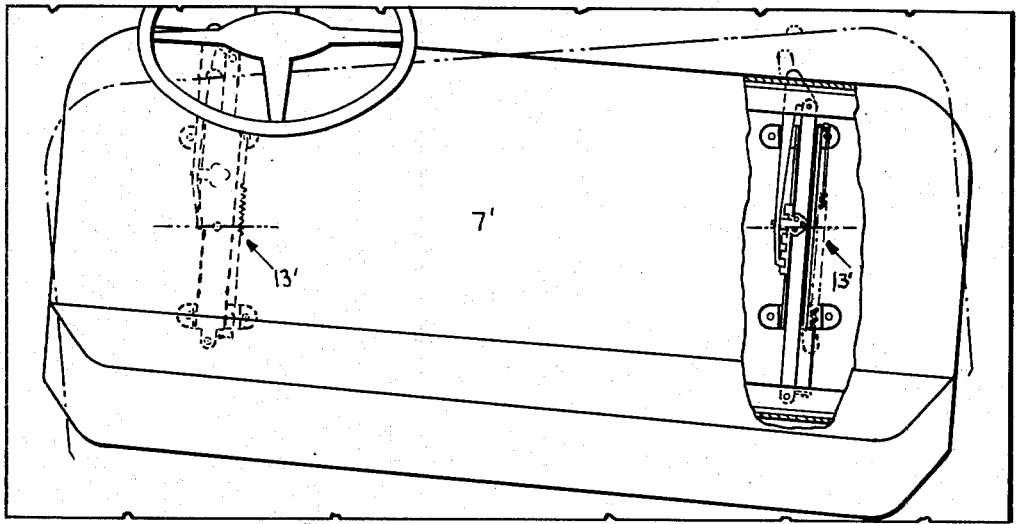
Fig.7.
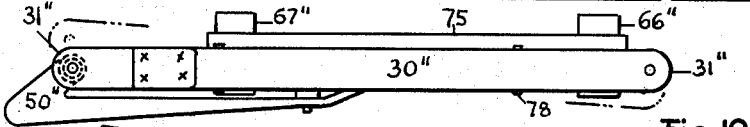
Fig.12.
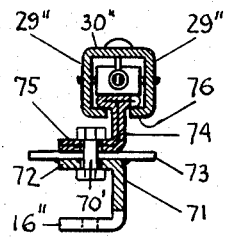
Fig.13.
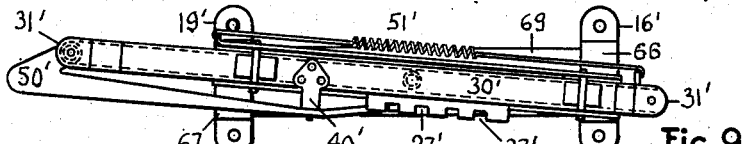
Fig.11.
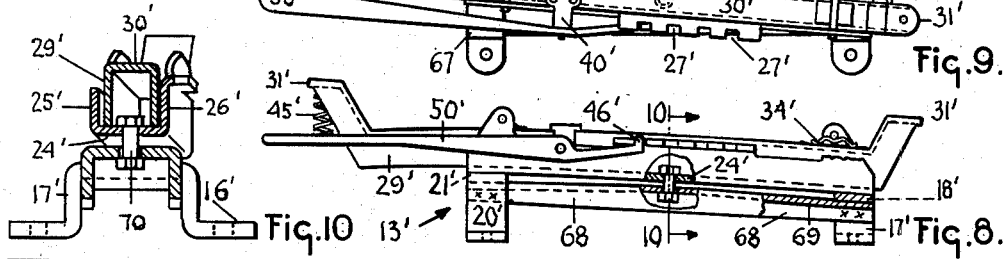
Fig.9.
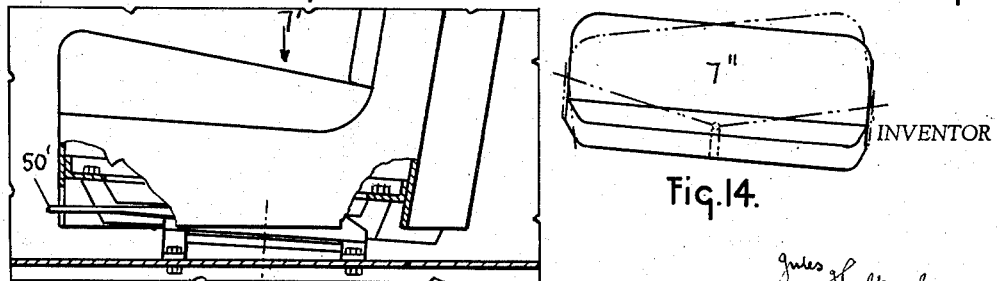
Fig.10.     Fig.8.
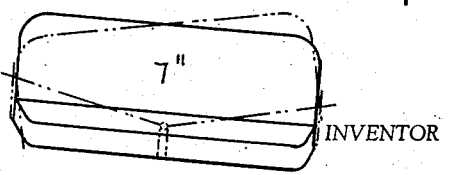
Fig.14.
Fig.6.
INVENTOR
Jules Haltenberger Patented June 22, 1954

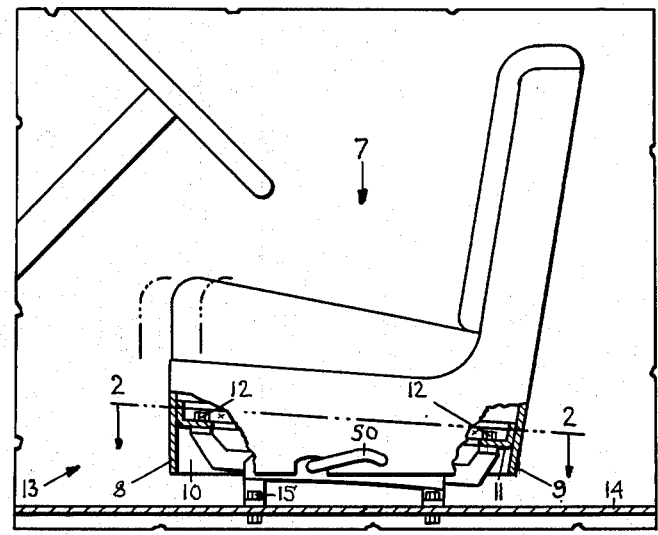
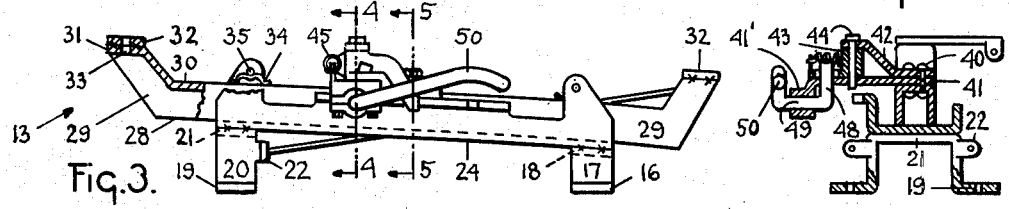
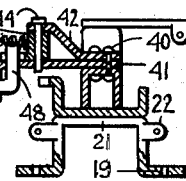
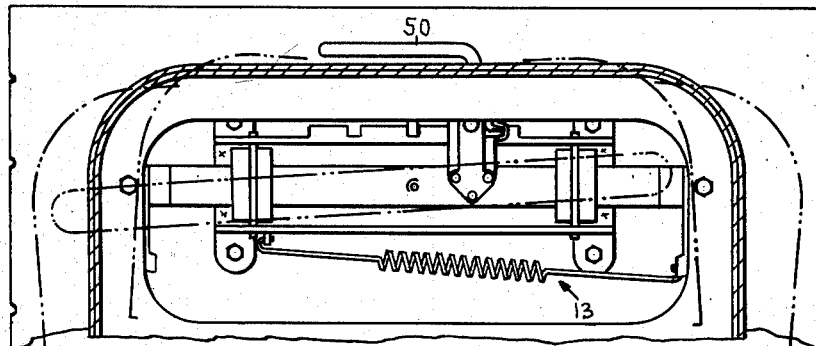
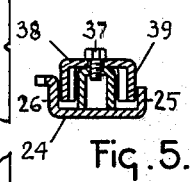

2,681,687

UNITED STATES PATENT OFFICE 2,681,687

MOTOR VEHICLE INDEPENDENT SEAT CONTROL

Jules Haltenberger, La Jolla, Calif.

Application December 8, 1948, Serial No. 64,208

4 Claims. (Cl. 155—14)

The present invention is a similar construction to applicant's copending application Serial No. 23,152 filed April 26, 1948, now abandoned.

Automobile front seats, now in use, are constructed and arranged as a unit, their length is constantly increasing, and now reaching up to 68 inches, accommodating in comfort three passengers. They are constantly perpendicular to the automobile, and are adjustable between the predetermined desired extremes.

It is here proposed and it is the object of my invention, to provide a front seat supporting slide mechanism where within predetermined desired extremes any perpendicularly disposed seat position is available, while at the same time the same slide mechanism is capable to permit any diagonal seat adjustment within said extremes. Here, shall be referred to as parallel and diagonal seat adjustment. Further, to provide releasable selective seat position locking means for any of these positions.

A further object is to provide for an automobile seat now having only parallel adjustment, a telescopic rack slide mechanism having parallel and also diagonal seat adjusting means, while retaining the rack floor securing means and locations, and rack seat securing means and locations, thereby creating an article of substitution.

Further objects will appear as the description proceeds.

Referring to the drawings, Fig. 1 is a side elevation of a left hand drive automobile unitary front seat with some parts broken away, having a side positioned release handle; Fig. 2 is a section substantially on line 2—2 of Fig. 1, here shown in a somewhat larger scale; Fig. 3 is a side elevation of the rack slide mechanism shown in Fig. 2; Fig. 4 is a section substantially on line 4—4 of Fig. 3; Fig. 5 is a section substantially on lines 5—5 of Fig. 3; Fig. 6 is a side elevation of a frontal lever releasable unitary automobile front seat, with parts broken away; Fig. 7 is a plan view of Fig. 6, with parts broken away; Fig. 8 is an enlarged side elevation of the telescopic rack slide mechanism shown in Figs. 6 and 7; Fig. 9 is a plan view of Fig. 8; Fig. 10 is a section substantially on line 10—10 of Fig. 8, here shown in a somewhat larger scale; Fig. 11 is a modification of the seat rack shown in Fig. 8; Fig. 12 is a plan view of Fig. 11; Fig. 13 is a section substantially on line 13—13 of Fig. 11, here shown in a somewhat larger scale; Fig. 14 schematically illustrates an automobile front seat having a back rest with usual diagonally hinged corners.

Referring to Figs. 1 to 5, inclusive, it will be seen that a unitary seat generally at 7 has a front wall 8, rear wall 9, and side walls 10. It is provided with a secured seat tray 11, having securing bolts 12 for fastening the seat to the slidable part of the automobile front seat rack slide mechanism, generally at 13. Rack 13 is composed of two major parts, it has a stationary member and a slide and pivotal member.

The stationary member forms a straight track, it is supported on a usual floor 14, and is secured thereto by bolts 15. This member is provided with a substantially terminal rear bridge support, having floor securing elements or flanges 16, upstanding walls 17 and an integral interconnecting top wall 18. A similar substantially terminal front bridge support is provided, having out-turned flanges 19, upstanding walls 20, and an integral top connecting wall 21. The inner edges of walls 20 are provided with spring anchoring lips 22.

The tops of connecting walls 18 and 21 are secured to the bottom surface of a wall 24 as by spot welding, a part of a wide U-shaped channel. At one side of wall 24, upstanding wall 25, formed integral therewith, is provided, and on the other side, an upstanding wall 26 is formed. This wall has an out-turned flange portion, providing adjustment position locking slots 27. Parts 16 to 27 form the stationary member of the rack sliding mechanism 13.

The stationary straight track member forms a slide surface and forms a guide for the slide and pivotal member of the rack. The slide member is an inverted narrow U-shaped member having sliding edges 28, side walls 29 integral therewith and top wall 30. The ends of the top wall are formed into substantially terminal seat securing elements or pads 31 and secured to them are spring anchor plates 32. The pads and plates have threaded holes 33 for seat bolts 12.

The slide member is held in yielding slide and pivotal relation on the bottom wall of the stationary element by flat springs 34, which are held in place by pins 35 passing through walls 25 and 26.

At the mid-portion, the slide member is provided with a threaded hole for the securement of cap-screws 37, arranged to secure a partially cylindrical bell shaped part having a top wall 38 and depending cylindrical walls 39. As indicated in Figs. 2 and 5, the outside diameter of walls 39 is less than the space in between walls 25 and 26, facilitating the substantially telescoping sliding. This partially cylindrical element forms a pivot fulcrum, being the sole means for laterally locating the seat in relation to the automobile. As clear from Fig. 2, applicant omits the partially cylindrical element from the passenger end rack. Otherwise, the driver and passenger end supporting racks have identical parts, though assembled in a different way.

On top wall 30, rivets 40 secure an overhanging lower bracket plate 41 and upper bracket plate 42, between these plates seat position locking hub 43 operates on pin 44. This hub is held in unidirectional tension by spring 45, and is provided with a seat position locking finger 46 and also with a release slot 47, wherein an upturned portion 48 of a release shaft 49 is arranged to operate. The release shaft bearing 41' is formed from an overhanging portion of the bracket 41. Shaft 49, outwardly terminates in seat position release lever 50. As indicated in Fig. 2, the rack stationary and slide members are interconnected by seat return spring 51.

In Fig. 1 the chain lines indicate the predetermined extreme fore and aft seat locations. In Fig. 2 the diagonal chain lines indicate the extreme diagonal seat position. With diagonal adjustment the driver's extreme aft position is indicated at 52 and extreme fore position at 53. With the here described rack slide mechanism, besides the extreme positions, the seat is adjustable to any position therebetween either parallel or diagonally, therefore, this slide mechanism is capable of substantially universal seat adjustment.

This rack slide mechanism, as shown in plan view in Fig. 2 forms a straight track, as indicated in Fig. 3, in side elevation, it is slightly arcuate. Applicant relies on the yield of the seat frame construction, and on the yield of the sliding mechanism flat springs to accommodate a possible error when the two seat ends are not in the identical transverse plane.

Figs. 6 to 13 illustrate a modification of the invention. For simplicity of presentation, the corresponding designating numerals are duplicated with an added prime. Referring to Figs. 6 to 10 inclusive, it will be seen, that a unitary front seat generally at 7', is supported near the seat ends thereof by identical seat rack slide mechanisms, generally at 13'. This rack is composed of three major parts, a stationary member, an intermediate pivotal member forming a track, and a slide member.

The stationary member is composed of a substantially terminal rear bridge support having out-turned securing elements or flanges 16', therewith integral side walls 17', and a top connecting wall 18' provided with a smooth top sliding surface 66. This member also contains a substantially terminal front bridge support, having out-turned securing flanges 19', and therewith integral side walls 20', and a top connecting wall 21', provided with a smooth sliding surface 67. The rear and front bridges are interconnected by an inverted U-shaped channel, by spot welding, and said channel has side walls 68 and an interconnecting top wall 69. In wall 69 applicant provides a hole with clearance for a pivot bolt 70, as indicated in Fig. 10.

The intermediate member or track as shown in plan views is a straight U-shaped channel, has a bottom wall 24' at mid-portion thereof is provided with a clearance hole for a pivot bolt 70. Integral with wall 24' upstanding walls 25' and 26' are provided. As indicated in Fig. 9, wall 25' at one end has an out-turned anchor for seat return spring 51'. Wall 26' is provided with an out-turned flange portion having seat position locking notches 27'. The intermediate member bottom wall and stationary member top wall are operatively connected by pivot bolt 70, disposed perpendicularly to the seat travel. At seat diagonal adjustment the ends of the intermediate member slide over the smooth surfaces 66 and 67.

The slide member is an inverted U-shaped channel arranged for free sliding in the intermediate member. It has side walls 29' and with them integral top wall 30', this wall terminates in seat engaging elements or pads 31'. As indicated in Fig. 9 a wall 29' at one end is provided with a spring anchor, thereby the slide member and stationary member are interconnected by seat return spring 51'.

The slide member top wall supports a bracket 40', serving as a hinge fulcrum for a seat position locking and releasing lever 50'. One end of the lever terminates in an upturned finger 46', arranged to engage any of the notches 27' positioned in the intermediate member, the other or operating end of the lever is loaded with adjusted seat position holding spring 45'.

The slide member is held in yielding free sliding relation in the intermediate member by flat springs 34'. Except for the small drag of these flat springs, the slide member is free to slide, in Fig. 10 between these members a lateral clearance is indicated.

The rack illustrated in Figs. 6 to 10, whereas straight in plan view, in side elevation is shown as very slightly arcuate. When it is desired to substitute a rack that is straight in plan and side elevation, this is illustrated in Figs. 11, 12 and 13. It will be seen that the rack generally at 13'' has a stationary member in the form of an angle piece, it is provided with floor securing elements or flanges 16'' and 19'', with them integral upstanding wall 71 and lateral wall 72.

Wall 72 is provided with pads 73 secured to said wall as by spot welding having smooth top sliding surfaces 66'' and 67'' respectively. The intermediate member is a T-shaped headed vertical wall 74, integral therewith is a lateral wall 75. Walls 72 and 75 are operatively interconnected by free fitting pivot bolt 70'. At diagonal seat adjustment the ends of wall 75 slide on smooth surfaces 66'' and 67'' respectively.

The slide member is composed of a top wall 30'' and therewith integral side walls 29'' in lateral spaced relation to the T-shaped head. The side walls have inturned portions 76 reaching under the T-shaped head. The load on the slidable part of the rack is taken up by a usual pair of rollers 77, operating on pins 78.

Any of the described seat rack slide mechanisms here illustrated, with vehicle seats having a unitary back rest, are equally applicable to seats having a back rest with usual diagonally hinged corners, such a seat is schematically shown in Fig. 14.

In the appended claims "straight slide" or "straight sliding" shall mean a straight slide as seen in a plan view of an automobile.

Applicant herein proposes a simple, light and inexpensive vehicle front seat adjustment, arranged for the convenience of front seat passengers of vastly different stature. The usual seat adjustment extreme of three and three-quarter inches when applied to a usual sixty-six inch seat, at diagonal adjustment creates but a slight angular disposition of the seat backrest.

The normal manufacturing clearances between the seat supporting mechanism operating parts provide sufficient clearances to prevent binding in the mechanism at diagonal adjustment. The herein proposed seat supporting and seat adjusted position locking means provide for any parallel or diagonal seat adjustments within the usually demanded limits, and the seat supporting mechanism as an article of substitution is applicable to automobiles now in use.

While I have herein shown and described only certain specific embodiments of my invention, and have suggested only certain possible modifications, it will be appreciated that many changes and variations can be made to suit particular conditions and embodiments of use, without departing from the spirit and scope of my invention.

What applicant claims as his invention:

1. For one end of a vehicle seat a seat end supporting seat rack slide mechanism, forming an article of manufacture, comprising an elongated substantially horizontal straight rack member having floor securing elements in straight sliding association with an elongated substantially horizontal straight sliding member having seat securing elements, and operative interconnecting and pivotal means between said members, permitting straight sliding and pivotal movement of said straight sliding member about a substantially vertical axis in relation to the member having floor securing elements.

2. A seat structure for a vehicle body, comprising a seat, a slide mechanism mounted beneath each end of the seat in supporting relation thereto, each mechanism including a straight substantially horizontal slide track and a substantially horizontal slide cooperable therewith, and means directly cooperating with said slide mechanism for pivotally connecting said track to the vehicle to permit forward and backward parallel and diagonal seat adjustment in cooperation with said straight substantially horizontal slide track.

3. A seat supporting and adjustment means for a motor vehicle having a transversely extending seat comprising, a seat rack mechanism beneath each end of the seat in supporting relation thereto, each mechanism including a substantially horizontal straight normally stationary member secured to the vehicle floor, substantially horizontal straight members selectively adjustably mounted on the stationary member whereby each end of the seat can be adjusted forwardly and backwardly selectively for diagonal and parallel adjustment, and pivotal mounting means about a substantially vertical axis at each end of said seat allowing such selective adjustment.

4. A vehicle seat supporting mechanism forming an article of manufacture, comprising a normally stationary elongated substantially horizontal straight rack member having substantially upright terminal floor securing elements, a substantially horizontal seat supporting elongated substantially straight slide member having substantially upright terminal seat securing elements, guiding and pivotal means between said members, whereby said seat supporting member is longitudinally slidably and pivotally mounted about a substantially vertical axis on said stationary member, and releasable adjustable locking means between said members.

References Cited in the file of this patent

UNITED STATES PATENTS

| Number | Name | Date |
|---|---|---|
| 2,100,170 | Parks | Nov. 23, 1937 |
| 2,101,350 | Simpson et al. | Dec. 7, 1937 |
| 2,129,952 | Lustig | Sept. 13, 1938 |
| 2,189,396 | Greig | Feb. 6, 1940 |
| 2,204,894 | Johnson | June 18, 1940 |
| 2,215,012 | McGregor | Sept. 17, 1940 |
| 2,219,456 | Saunders et al. | Oct. 29, 1940 |
| 2,563,220 | Doty | Aug. 7, 1951 |

FOREIGN PATENTS

| Number | Country | Date |
|---|---|---|
| 464,306 | France | Jan. 9, 1914 |